(12) United States Patent
Nabilsi

(10) Patent No.: US 7,249,879 B2
(45) Date of Patent: Jul. 31, 2007

(54) EASY POUR BLENDER

(76) Inventor: Yunes Nabilsi, 11938 South St., Artesia, CA (US) 90701

( * ) Notice: Subject to any disclaimer, the term of this patent is extended or adjusted under 35 U.S.C. 154(b) by 0 days.

(21) Appl. No.: 11/497,098

(22) Filed: Aug. 1, 2006

(65) Prior Publication Data

US 2007/0030757 A1     Feb. 8, 2007

Related U.S. Application Data

(60) Provisional application No. 60/705,959, filed on Aug. 4, 2005.

(51) Int. Cl.
*A47J 43/046*     (2006.01)

(52) U.S. Cl. .................. 366/195; 366/205; 366/286; 222/235

(58) Field of Classification Search ............. 366/189, 366/286, 289, 205, 194–196; 222/233–235, 222/242–243
See application file for complete search history.

(56) References Cited

U.S. PATENT DOCUMENTS 2,990,978 A * 7/1961 Charos .................. 222/235
5,071,040 A * 12/1991 Laptewicz, Jr. ......... 222/235
6,431,743 B1 * 8/2002 Mizutani et al. ........ 366/195
2007/0030757 A1 * 2/2007 Nabilsi ................... 366/195

FOREIGN PATENT DOCUMENTS

JP      6-269367      * 9/1994

* cited by examiner

*Primary Examiner*—Charles E. Cooley
(74) *Attorney, Agent, or Firm*—Clement Cheng

(57) ABSTRACT

A blender has a container body, a push plate, a blade assembly that is mounted on the push plate and a guide rod mounted to the container body and affixed to the push plate limiting the push plate to substantially vertical movement. A variety of well known lifting mechanisms can be mechanically actuated by the handle and can also be actuated by a squeeze mechanism where the handle travels linearly as opposed to rotationally. To overcome the stickiness drawback in blender container bodies, the present invention uses a push plate to push the contents out of the container body.

9 Claims, 3 Drawing Sheets

EASY POUR BLENDER

This application claims priority from Easy Pour Blender provisional application No. 60/705,959 filed Aug. 4, 2005 for inventor Nabilsi, Yunes.

BACKGROUND OF THE INVENTION

To empty a blender is difficult when making smoothies. Inevitably, the contents stick to the container. A variety of systems and methods have been devised for addressing this problem. In U.S. Pat. Nos. 6,854,875 and 6,338,569 issued to inventor McGill, the disclosures of which are incorporated herein by reference, the food blending apparatus shows a consumption container integrally formed with the blender body. To overcome the stickiness drawback in blender container bodies, the present invention uses a push plate to push the contents out of the container body.

DETAILED DESCRIPTION OF THE PREFERRED EMBODIMENT

Figure 1:
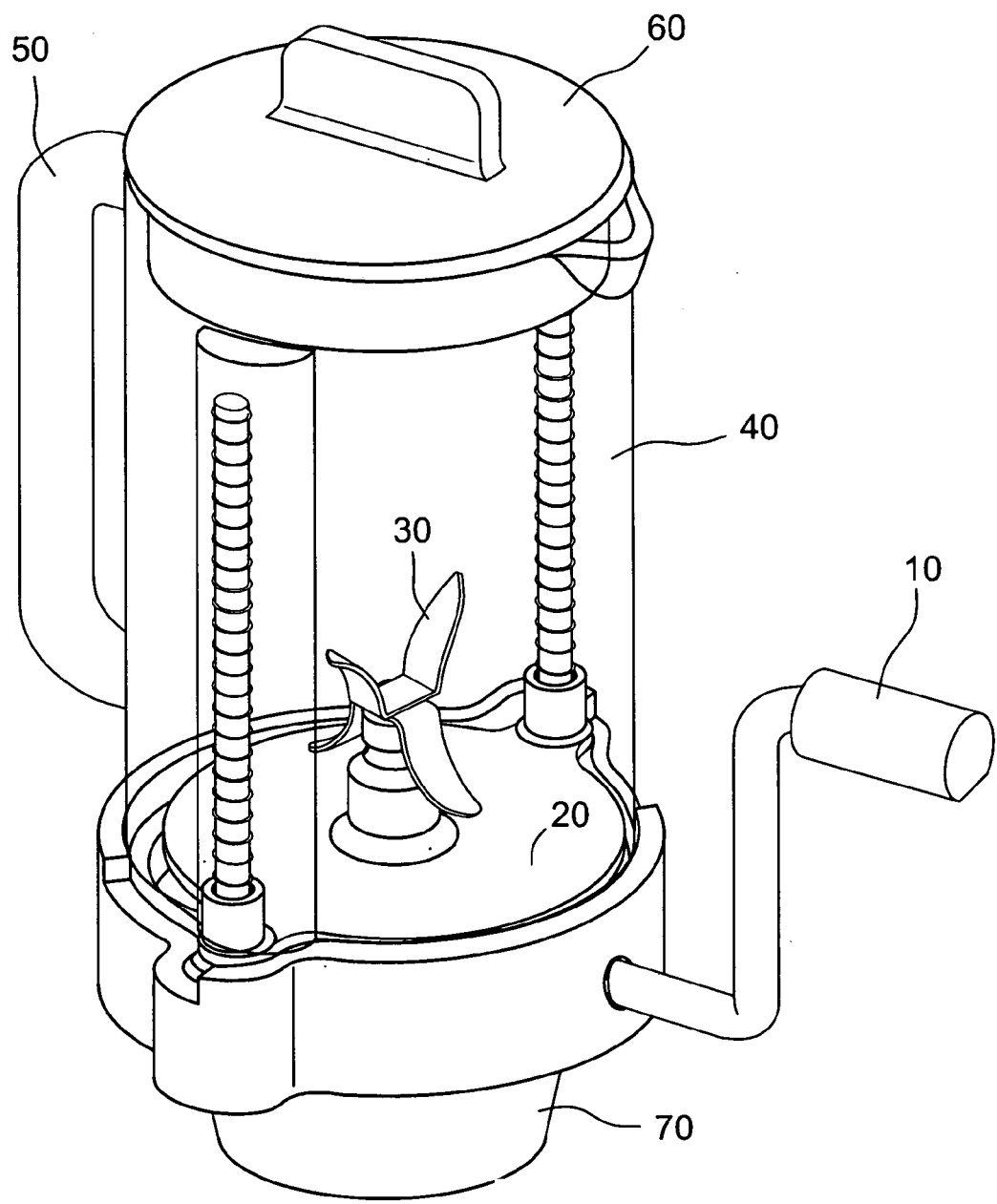
FIG. 1 is an assembled view of the preferred embodiment of the present invention.
Figure 2:
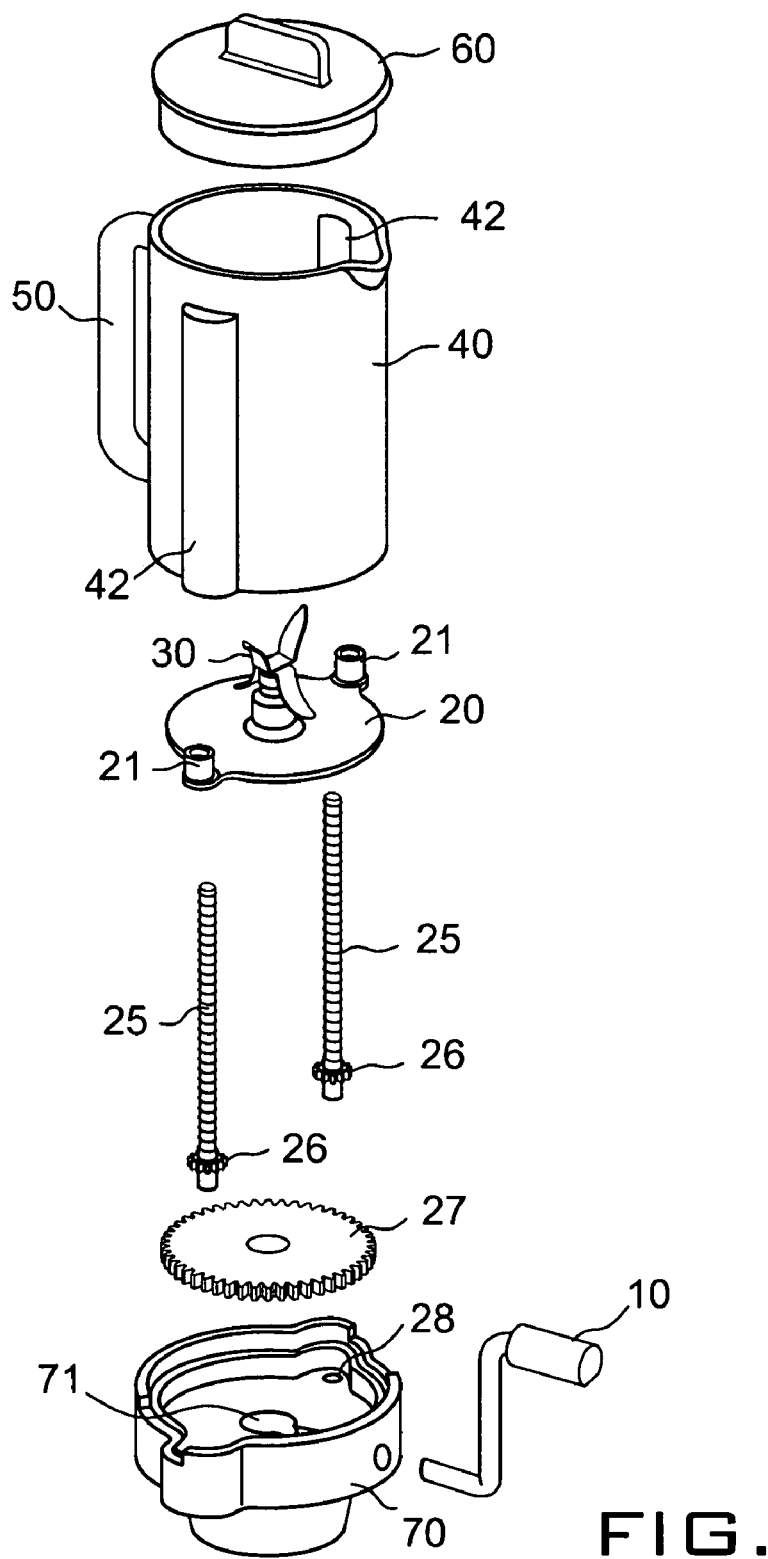
FIG. 2 is and exploded view of the preferred embodiment of the present invention, displaying assembly of the device.

The improved blender is seen in figure one. A hand crank 10 powers the push plate 20 of the device. The device has traditional blade assembly 30 mounted on the push plate 20. The blender has a body 40 with a handle 50 and a lid 60 assembled atop a base 70. The hand crank rotates gears that bias the push plate 20 up to dislodge and empty contents of the improve blender as shown in figure one. Exploded view FIG. 2 shows that the push plate 20 rides on a pair of guide rods 25. The guide rods 25 are threaded so that rotation of the rods 25 cooperate with the collar 21 through which the rods are slidingly mounted so that the collar and push plate is pushed up or down when the guide rods 25 rotate counterclockwise or clockwise. Without the hand crank, a user must push out the contents manually.

Optionally, the container body 40 can have recessed grooves 42 providing travel of the blender up and down the body. The vertically recessed grooves 42 accommodate the guide rods. The base member 70 further includes a bored aperture 71 allowing the blender to rest on the motorized portion, not shown in the drawings. The exploded view, FIG. 2 shows the central gear 27 that is turned by the handle 10, and which turns the guide rods 25 by geared connection. The guide rods 25 have gears 26 cooperating with the central gear 27.

Assembly begins with the base 70 receiving the handle 10 and the central gear 27. Guide rods 25 fit into slots 28 located on the base for the guide rods. The push plate 20 installs over the base and the container body 40 installs over the push plate. Later, the lid 60 over the container body 40.

Figure 3:
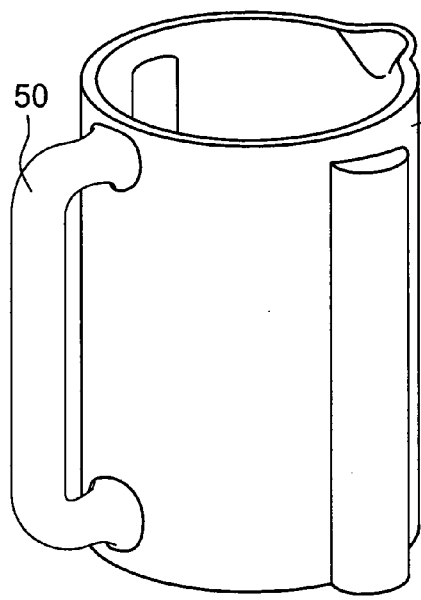
FIG. 3 is a view of the container body having the hand crank.
Figure 4:
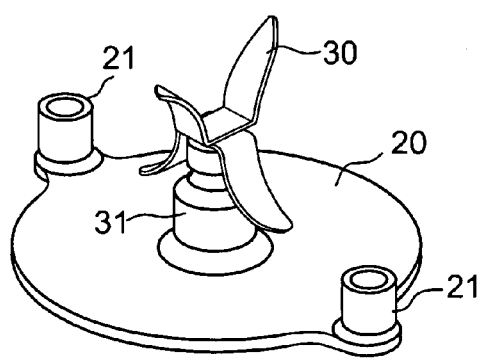
FIG. 4 is a view of the blade and pusher assembly.

Looking at FIG. 3, the container body is shown as a single member having a handle 50. FIG. 4 shows a push plate 20 in fixed cooperation with the container body 40 preferably having a watertight seal between the circular profile of the push plate 20 and the circular profile of the container body 40.

Figure 5:
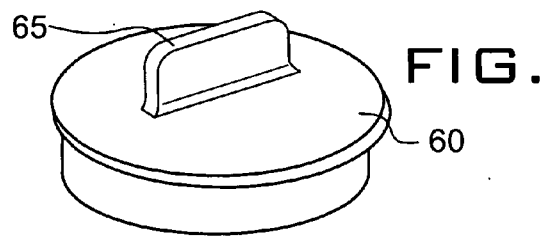
FIG. 5 is a view of the central gear assembly.

The push plate 20 has a set of blades 30 of typical configuration wherein a pair of upper blades cooperates with a pair of lower blades to mix contents when the blender is operating. The blades are set upon a blade mounting allowing vertical axial rotation at least a several hundred revolutions per minute. The push plate 20 further includes collar members 21 providing vertical lift as well as wiping of the guide rods 25 preferably in watertight interface. FIG. 5 shows the lid shaped so that at the upper position of the travel of the push plate, the blades fit in the hollow under part of the lid 60. The lid 60 preferably has a lid handle 65 allowing removal of the lid 60 as well as storage of the blades when the push plate is in upper position.

Figure 6:
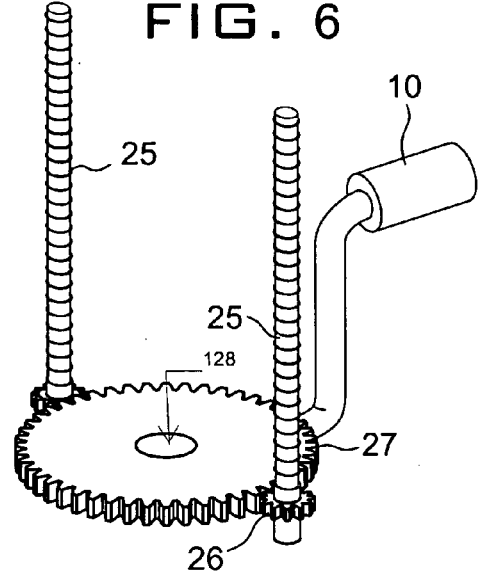
FIG. 6 is a view of the collar.

FIG. 6 shows a mechanical configuration of the lifting mechanism. The lifting mechanism is mechanically actuated by the handle 10 and can also be actuated by a squeeze mechanism where the handle travels linearly as opposed to rotationally. A variety of lifting mechanisms are well known.

In the mechanism for pushing the push plate 20, the rotation of the gear 26 can be made about a stationary guide rod 25 that is a fixed to the base 70 or the gear 26 can be rigidly affixed to the guide rod 25 so that the guide ride rotates. The handle 10 can retract of the push plate. Alternatively, well known mechanisms can be made to allow a faster retraction of the push plate 20.

FIG. 6 further includes the opening in the central gear 128 providing a clearance for the mounting of the motor coupling to the blade mount 31 providing power to the blade 30.

Figure 7:
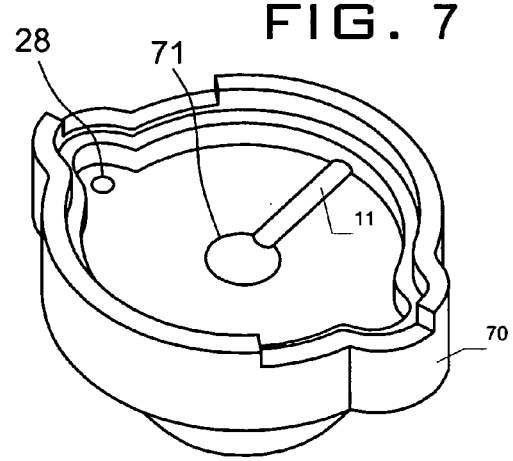
FIG. 7 is a perspective view of the base.

FIG. 7 shows the base 70 having the mounting slots 28 for the guide rods 25 and the aperture 71 allowing the blender to rest on the motorized coupling. Also, a handle slot 11 retains the handle 10 within the base member 70.

The invention claimed is:

1. A blender comprising:
   a. a container body having a top opening;
   b. a push plate;
   c. a blade assembly, wherein the blade assembly is mounted on the push plate;
   a guide rod mounted to the container body and affixed to the push plate limiting the push plate to substantially vertical movement, wherein during push plate upward movement, the push plate pushes container contents out of the top opening, a handle mechanically connected to the guide rod and wherein the guide rod is threaded so that rotation of the guide rod cooperates with a collar through which the rod is slidingly mounted so that the push plate is pushed up or down when the guide rod rotates.

2. The blender of claim 1, wherein the collar provides vertical lift and wherein the collar wipes the guide rod.

3. A blender comprising:
   a. a container body having a top opening;
   b. a push plate;
   c. a blade assembly, wherein the blade assembly is mounted on the push plate;
   a guide rod mounted to the container body and affixed to the push plate limiting the push plate to substantially vertical movement, wherein during push plate upward movement, the push plate pushes container contents out of the top opening,
   a second guide rod mounted to the container body and affixed to the push plate limiting the push plate to substantially vertical movement;

a handle mechanically connected to the guide rods and wherein the guide rods are threaded so that rotation of the guide rods cooperates with collars through which the rods are slidingly mounted so that the push plate is pushed up or down when the guide rods rotate.

4. The blender of claim 3, wherein the collar provides vertical lift and wherein the collars wipe the guide rods.

5. A blender comprising:
   a. a container body having a top opening;
   b. a push plate;
   c. a blade assembly, wherein the blade assembly is mounted on the push plate;
   d. a first guide rod mounted to the container body and affixed to the push plate limiting the push plate to substantially vertical movement,
   a motor coupled to the blade assembly providing power to the blade assembly, wherein during push plate upward movement, the push plate pushes container contents out of the top opening;
   a handle mechanically connected to the first guide rod that is threaded so that rotation of the guide rod cooperates with a collar through which the first guide rod is slidingly mounted so that the push plate is pushed up or down when the guide rod rotates.

6. A blender comprising:
   a. a container body having a top Opening;
   b. a push plate;
   c. a blade assembly, wherein the blade assembly is mounted on the push plate;
   d. a first guide rod mounted to the container body and affixed to the push plate limiting the push plate to substantially vertical movement,
   e. a motor coupled to the blade assembly providing power to the blade assembly, wherein during push plate upward movement, the push plate pushes container contents out of the top opening;
   a second guide rod mounted to the container body and affixed to the push plate limiting the push plate to substantially vertical movement.

7. The blender of claim 6, further comprising: a vertically recessed groove in the container body, wherein the first guide rod is mounted in the vertically recessed groove.

8. The blender of claim 6, further comprising: a handle mechanically connected to the first guide rod and wherein the first guide rod is threaded so that rotation of the first guide rod cooperates with a collar through which the first guide rod is slidingly mounted so that the push plate is pushed up or down when the first guide rod rotates.

9. The blender of claim 6, further comprising: a handle mechanically connected to the first guide rod so that a movement of the handle moves the push plate up, wherein the first guide rod cooperates with a collar through which the first guide rod is slidingly mounted.

* * * * *